United States Patent [19]

Nakamura

[11] 4,060,596
[45] Nov. 29, 1977

[54] METHOD OF MAKING GOETHITE POWDER

[75] Inventor: Tokio Nakamura, Yokohama, Japan
[73] Assignee: Sony Corporation, Tokyo, Japan
[21] Appl. No.: 627,757
[22] Filed: Oct. 31, 1975

Related U.S. Application Data

[63] Continuation of Ser. No. 401,415, Sept. 27, 1973, abandoned.

[30] Foreign Application Priority Data

Sept. 30, 1972  Japan ............................ 47-98511

[51] Int. Cl.² .................................... C01G 49/06
[52] U.S. Cl. .............................. 423/633; 423/634
[58] Field of Search ................. 423/632, 633, 634

[56] References Cited

U.S. PATENT DOCUMENTS

| | | | |
|---|---|---|---|
| 3,047,428 | 7/1962 | Goto et al. | 423/634 |
| 3,692,683 | 9/1972 | Geus | 252/62.56 |
| 3,843,773 | 10/1974 | Pingaud | 423/634 |
| 3,912,646 | 10/1975 | Leitner et al. | 423/633 |

FOREIGN PATENT DOCUMENTS

| | | | |
|---|---|---|---|
| 505,751 | 9/1954 | Canada | 423/633 |
| 1,212,126 | 11/1970 | United Kingdom | 423/634 |

OTHER PUBLICATIONS

Arden, "Solubility Products of Ferrous and Ferric Hydroxides," *Journal of the Chemical Society* Mar., 1950 pp. 882–885 pt. 1.

*Primary Examiner*—Edward J. Meros
*Assistant Examiner*—Brian E. Hearn
*Attorney, Agent, or Firm*—Hill, Gross, Simpson, Van Santen, Steadman, Chiara & Simpson

[57] ABSTRACT

A method of making goethite powder in which a ferrous hydroxide suspension is stirred for about 3 hours in an inert atmosphere and then is oxidized to form goethite powder.

12 Claims, 5 Drawing Figures

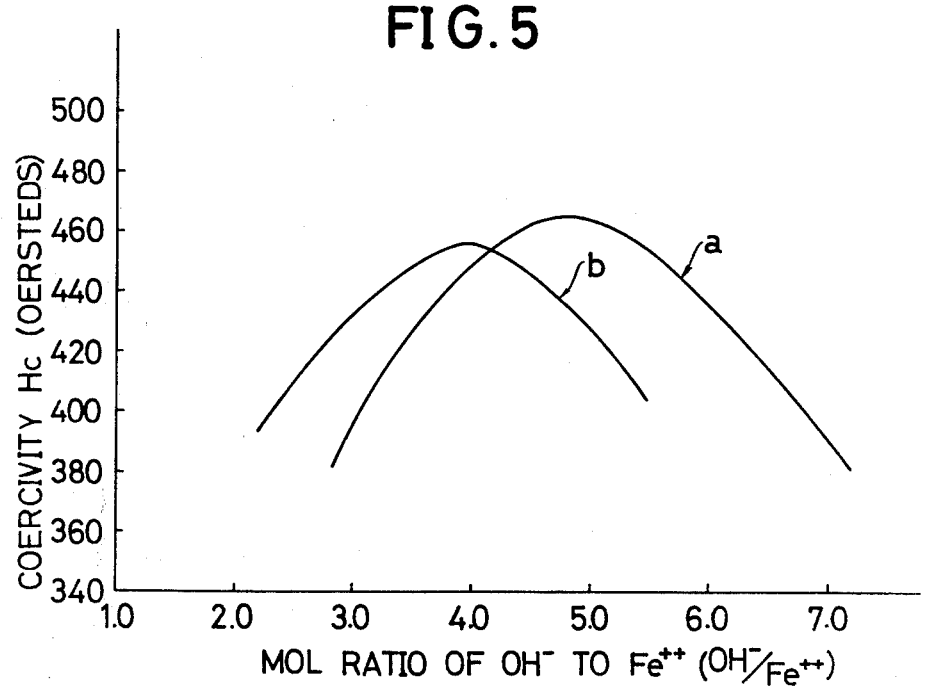

METHOD OF MAKING GOETHITE POWDER

This is a continuation of application Ser. No. 401,415, filed Sept. 27, 1973, now abandoned.

BACKGROUND OF THE INVENTION

1. Field of the Invention

This invention relates to a method of making goethite powder and more particularly to a method of making goethite powder useful for making maghemite powder of high coercivity.

2. Description of the Prior Art

In a magnetic tape suitable for use with a tape recorder, a video tape recorder and the like, acicular maghemite powder (or gamma-$Fe_2O_3$ powder) is widely used. However, as the coercivity (Hc) of conventional acicular maghemite powder is under 400 oersteds, it is not suitable for high density recording.

Acicular maghemite powder made by the known route of reducing and oxidizing goethite powder (or alpha-FeOOH powder) has a coercivity which depends on the particle size, the particle shape, and the particle size uniformity of the goethite powder used as the starting material.

Heretofore, two methods have commonly been employed for making conventional goethite powder. One of these methods involves bubbling air through a solution of iron sulfate and sodium hydroxide to form goethite powder and sulfuric acid, and then the resulting sulfuric acid is changed to iron sulfate by iron. One disadvantage of this method is that excessive time (typically ranging from several days to several months) are required for the formation of goethite. Another disadvantage of this method is that the coercivity (Hc) of the maghemite powder derived from the resulting goethite by the above indicated known route, is under 370 oersteds.

The other of these methods involves bubbling air though an aqueous solution of ferrous salt and alkaline hydroxide to form goethite powder. The maghemite powder derived from such resulting goethite by the above indicated known route generally has a higher coercivity (Hc) than the maghemite powder derived from the goethite obtained by the preceding two-stage method. However, one disadvantage of the second method is that about 10 to 20 hours are required for the formation of goethite. Another disadvantage of this second method is that the hydroxide is apt to gel and be non-uniform, particularly if a suspension of ferrous hydroxide of high density is used, thereby making it is very difficult to form a geothite powder with uniform particle size.

BRIEF SUMMARY OF THE INVENTION

The present invention is directed to a method for making a goethite powder using an aqueous ferrous hydroxide suspension. The suspension is stirred for a relatively brief period of time in an inert gaseous atmosphere. Thereafter, the resulting suspension is oxidized with oxygen to form goethite powder.

An object of this invention is to provide an improved method of making a goethite powder suitable for use as a starting material for making an acicular maghemite powder preferably in a short time.

Another object of this invention is to provide a method of making a goethite powder suitable for use as a starting material for making an acicular maghemite powder of high coercivity (preferably over 400 oersteds).

A further object of this invention is to provide a method of making goethite powder with uniform particle size by a step of stirring ferrous hydroxide suspension in an inert atmosphere.

Other and further aims, objects, purposes, advantages, utilities, and features will be apparent to those skilled in the art from a reading of the present specification and drawings.

BRIEF DESCRIPTION OF THE DRAWINGS

FIG. 5 is a graph showing the relationship between the mol ratio of OH— to FE++ (OH−/Fe++) and the coercivity (Hc) of a maghemite powder derived from a goethite powder which is prepared by the teachings of the present invention.

EMBODIMENTS

Figure 1:
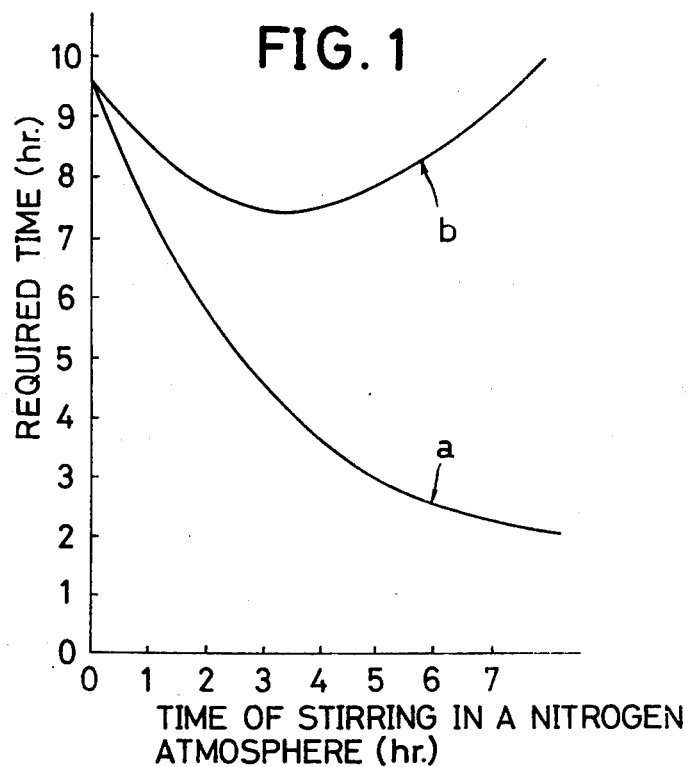
FIG. 1 is a graph showing the relationship between the time of stirring in a nitrogen atmosphere and the time required for a reaction according to the embodiment of Example 1 hereinbelow.

The present invention is further illustrated by reference to the following Examples. Those skilled in the art will appreciate that other and further embodiments are obvious and within the spirit and scope of this invention from the teachings of these present Examples taken with the accompanying specification and drawings.

EXAMPLE 1

An alkaline solution including potassium hydroxide in an amount of 392 grams (7.0 moles) mixed with 800 milliliters of water was charged to a reaction vessel.

279 grams (1.4 moles) of ferrous chloride ($FeCl_2 \cdot 4H_2O$) dissolved into 400 milliliters of water was gradually added to the alkaline solution with stirring to form a colloidal suspension of ferrous hydroxide. Previously, an inert gas, for example, a nitrogen gas was passed, as by bubbling, through the alkaline solution at a flow rate of 3.0 liters per minute to remove oxygen therein.

As the ferrous chloride was added, nitrogen gas was bubbled (sparged) into and through the resulting solution in a reaction vessel while keeping the temperature at 80° C with continuous stirring using this procedure, a covering or blanket of the nitrogen gas was maintained over the surface of the resulting liquid reaction system. This bubbling was continued until a milk-white, uniform colloidal ferrous hydroxide was obtained. The time required for the reaction (as measured from the commencement of reacting alkali hydroxide with the ferrous chloride to a point when formation of this colloidal ferrous hydroxide was deemed complete) was about three hours.

Next, the nitrogen gas was switched over to air, and air sparging was commenced at a flow rate of 5.0 l/min, through the resulting liquid reaction system at the temperature of 80° C with continuous stirring to form a yellow goethite in 4.5 hours.

After rinsing with water, the goethite material was filtered, dried and pulverized to obtain 120 grams of yellow goethite powder. The particles of this yellow goethite powder were acicular, about 0.5 microns in length, and about 20 in acicular ratio, where the acicular ratio value is obtained by dividing the average length of the particle by the average diameter of the particle. Moreover, the uniformity of the particle size of the goethite powder was good.

2.0 grams of this goethite powder was reduced at a temperature of 350° C with the passing of hydrogen gas thereover at a flow rate of 1.0 l/min for one hour, after which the resulting product was oxidized by passing air thereover at a temperature of 230° C for one hour. As a result, a brown maghemite powder (gamma-$Fe_2O_3$ powder) was obtained. The coercivity (Hc), squareness ratio (Rs) and saturation magnetization $\sigma$ s of this resulting gamma-$Fe_2O_3$ were 466 oersteds, 55%, and 69.5 emu/g, respectively.

2.0 more grams of the same goethite powder was reduced at a temperature of 380° C with the passing of hydrogen gas thereover at a flow rate of 1.0 l/min for one hour, after which the resulting product was oxidized by passing air thereover at a temperature of 250° C for one hour, to produce a maghemite powder. The coercivity (Hc), squareness ratio (Rs), and saturation magnetization $\sigma$ s of such gamma-$Fe_2O_3$ were 480 oersteds, 55%, and 65.1 emu/g, respectively.

Referring to FIG. 1, there is seen a graph which shows the relationship between the time of stirring in the nitrogen atmosphere and the required reaction time at (a) a constant density of the suspension comprising the liquid reaction system (b) a constant reaction temperature and (c) a constant flow rate of air. In this graph, the axis of abscissas shows the time of stirring in the nitrogen atmosphere, and the axis of ordinates shows the required reaction time. The curve *a* shows the variations of the time required for the formation of the goethite after the beginning of the oxidation reaction, and the curve *b* shows the variations of the time of stirring in the nitrogen atmosphere plus the time required for the formation of goethite after the beginning of the oxidation reaction.

In this Example, the time of the end of the oxidative reaction between air and colloidal ferrous hydroxide (that is, the time when the ferrous ($Fe^{++}$) ions are substantially completely consumed) was decided in the following manner: A sample of 5 milliliters of the reacting liquid reaction system was taken out from the reaction vessel every ten minutes after the beginning of such oxidative reaction (that is, after commencement of ferrous chloride addition to potassium hydroxide with nitrogen blowing), and the sample was added to a dilute hydrochloric acid solution from which oxygen had been removed to prevent oxidation by the passing of nitrogen gas therethrough, and the unreacted ferrous hydroxide in such sample was dissolved therein. The amount of hydrochloric acid in this dilute solution was adjusted so that the PH of the resulting solution was in the range from one to seven. Then, the Ferrous ions $Fe^{++}$ in the resulting solution were detected by using a sensitive $Fe^{++}$ ion detecting paper. The paper used was and is available commercially as Merckoquant $Fe^{++}$, a trade mark of E-Merck Company. The time when no ferrous ion $Fe^{++}$ could be so detected in such a sample was regarded as the time of the end of the oxidative reaction.

Figure 2:
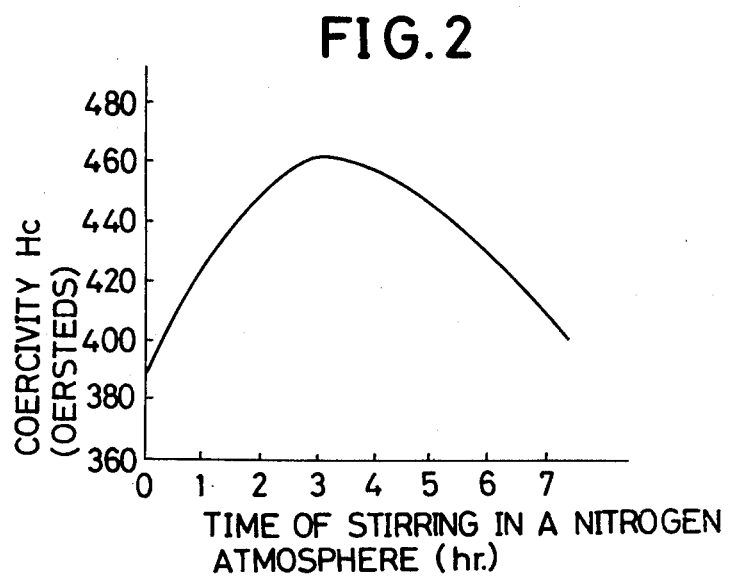
FIG. 2 is a graph showing the relationship between the time of stirring in a nitrogen atmosphere and the coercivity (Hc) of a resulting maghemite powder according to such Example 1 embodiment.

FIG. 2 shows the relationship between the time of stirring in the nitrogen atmosphere and the coercivity (Hc) of the gamma-$Fe_2O_3$ derived from the resulting goethite powder as the starting material. As shown by FIG. 2, it is preferable to stir the solution for a time interval of from about 2 to 5 hours in an inert (e.g., oxygen free) gas in order to obtain the desired goethite powder for use as a starting material for the gamma-$Fe_2O_3$ of high coercivity, for example, over 440 oersteds.

EXAMPLE 2

For the comparison, the following conventional method of making goethite powder and the property of the gamma-$Fe_2O_3$ obtained in the same method, is described in the following example:

The aqueous soluton of chloride was mixed with the aqueous solution of potassium hydroxide and stirred at the temperature of 80° C with the passing of air at a flow rate of 5.0 l/min. In this case, there was not the stirring treatment in the inert atmosphere as in the method of the invention. In 9.5 hours, the reaction ended and yellow goethite was formed. After rinsing with water, the material was filtered, dried and pulverized to obtain 120 grams of goethite powder. The particles of the resulting goethite powder were acicular, about 0.8 microns in length and about 10 in acicular ratio.

As in the Example 1 of the invention, 3.0 grams of the goethite powder was reduced at the temperature of 350° C by hydrogen gas and then it was oxidized at the temperature of 230° C by air to form the gamma-$Fe_2O_3$. The coercivity (Hc), squareness ratio (Rs) and saturation magnetization $\sigma$ s of the resulting gamma-$Fe_2O_3$ were 387 oersteds, 54% and 67.1 emu/g, respectively. As understood from this results, the coercivity (Hc) of the gamma-$Fe_2O_3$ according to the method of this invention is higher than that of the gamma $Fe_2O_3$ according to the conventional method.

EXAMPLE 3

An alkaline solution including sodium hydroxide in an amount of 256 grams (6.4 moles) mixed with 600 milliliters of water was charged to a reaction vessel.

445 grams (1.6 moles) of ferrous sulfate ($FeSO_4.7H_2O$) dissolved into 600 milliliters of water was gradually added to the alkaline solution with stirring to form suspension of ferrous hydroxide. Previously, a nitrogen gas was passed through the alkaline solution at a flow rate of 2.0 l/min to remove oxygen therein. Simultaneously, and in the manner of Example 1, nitrogen ($N_2$) gas was sparged into the resulting suspension maintained at a temperature of 60° C with continuous stirring until milk-white uniform colloidal ferrous hydroxide was obtained. The time required for this reaction was about three hours.

After that, the nitrogen gas was switched over to air which, at a flow rate of 1.0 l/min, was passed through the resulting suspension maintained at a temperature of 60° C with continuous stirring to form by oxidation yellow goethite in 6.5 hours.

After rinsing with water, the material was filtered, dried and pulverized to obtain 140 grams of yellow goethite powder. The particles of the yellow goethite powder were acicular, about 0.5 microns in length and about 20 in acicular ratio (measured as in Example 1). Moreover, the uniformity of the particle size of the goethite powder was good.

2.0 grams of this goethite powder was reduced at a temperature of 350° C with the passing therethrough of hydrogen gas at a flow rate of 1.0 l/min for one hour, and then the produce was oxidized by air passing therethough at a temperature of 250° C for one hour. As the result, the brown powder of gamma-$Fe_2O_3$ was obtained. The coercivity (Hc), squareness ratio (Rs), and saturation magnetization $\sigma$ s of this gamma-$Fe_2O_3$ powder was 458 oersteds, 55% and 65.6 emu/g, respectively.

Figure 3:
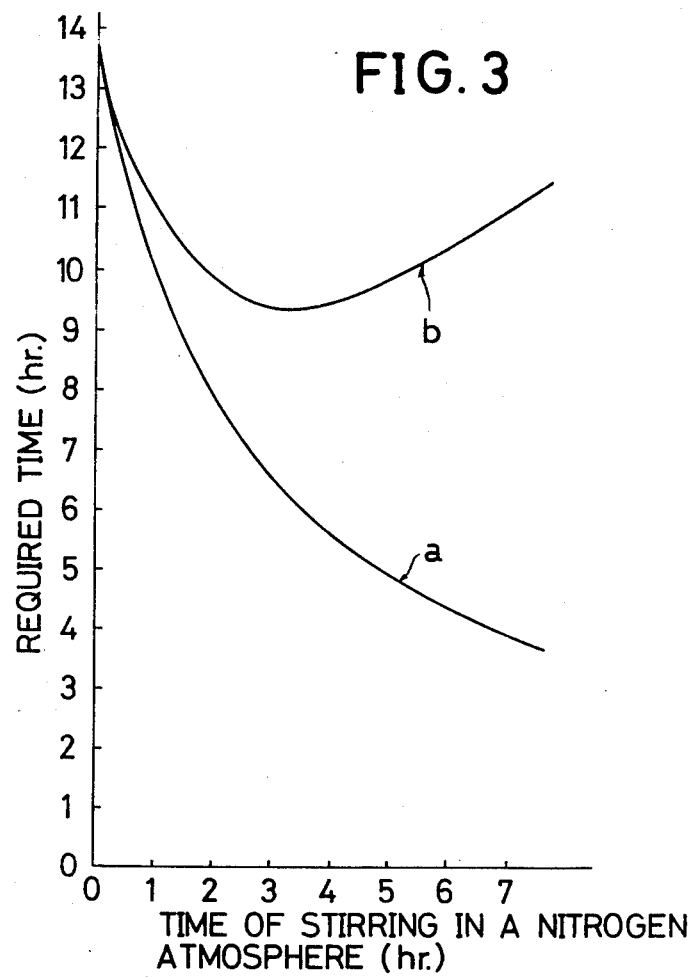
FIG. 3 is a graph showing the relationship between the time of stirring in a nitrogen atmosphere and the time required for a reaction according to the embodiment of Example 2 of this invention hereinbelow.

Referring to FIG. 3, there is seen a graph showing the relationship in this example between the time of stirring in the nitrogen atmosphere and the required reaction time at (a) a constant density of the reaction suspension, (b) a constant reaction temperature, and (c) a constant flow rate of air. In this graph, the axis of abscissas shows the time of stirring in the nitrogen atmopshere and the axis of ordinates shows the required time. A curve $a$ shows the variations of the time required for the formation of the goethite after the beginning of the air oxidative reaction, and a curve $b$ shows the variations of the time of stirring in the nitrogen atmosphere plus the time required for the formation of the goethite after the beginning of the oxidative reaction.

Figure 4:
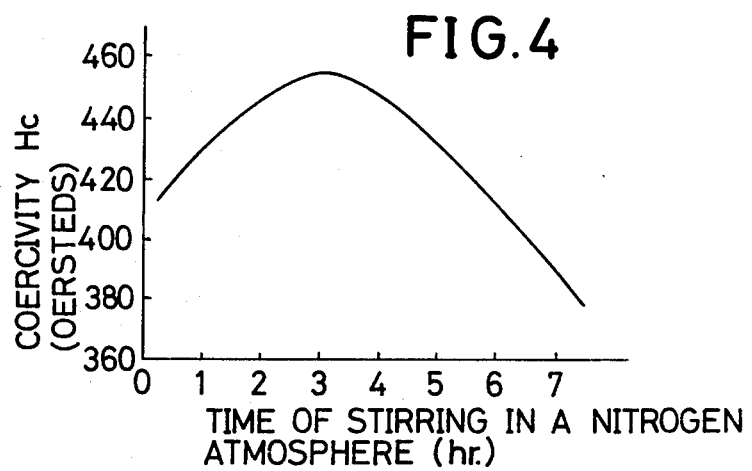
FIG. 4 is a graph showing the relationship between the time of stirring in a nitrogen atmosphere and the coercivity (Hc) of a resulting maghemite powder according to such Example 2 embodiment of this invention.

FIG. 4 shows the relationship in this Example between the time of stirring in the nitrogen atmopshere and the coercivity (Hc) of the gamma-$Fe_2O_3$ powder derived from the resulting goethite powder as the starting material. As shown in FIG. 4, it is preferable to stir the solution for 2 to 4 hours in the nitrogen gas in order to obtain a desired goethite powder for use as the starting material for the gamma-$Fe_2O_3$ of high coercivity, for example, over 440 oersteds.

In Example 1 and Example 3, the amounts of potassium hydoxide (KOH) and ferrous chloride ($FeCl_2.4H_2O$), and sodium hydroxide (NaOH) and ferrous sulfate ($FESO_4.7H_2O$), were varied; in other words, the mol ratio of $OH^-$ ion to $Fe^{++}$ ion ($OH^-/Fe^{++}$) was varied.

EXAMPLE 4

An alkaline solution including potassium hydroxide in an amount of 336 grams (6.0 moles) mixed with 900 milliliters of water was charged to a reaction vessel.

334 grams (1.2 moles) of ferrous sulfate ($FeSO_4.7H_2O$) dissolved into 500 milliliters of water was gradually added to the alkaline solution with stirring to form a suspension of ferrous hydroxide. Previously, a nitrogen gas was passed through the alkaline solution at a flow rate of 3.0 l/min to remove oxygen therein. Simultaneously, in a manner similar to Example 1, nitrogen gas was sparged into the resulting suspension at a temperature of 80° C with continuous stirring until the milk-white uniform colloidal ferrous hydroxide was obtained. The time required for this reaction was about three hours.

After that, the nitrogen gas was switched over to air which, at a flow rate of 5.0 l/min, was passed through the resulting suspension at the temperature of 80° C with continuous stirring to form by oxidation yellow goethite in 4.0 hours.

After rinsing with water, the material was filtered, dried and pulverized to obtain 109 grams of yellow goethite powder. The particles of the yellow goethite powder were acicular, about 0.4 microns in length and about 15 in acicular ratio (measured as in Example 1). Moreover, the uniformity of the particle size of the goethite powder was good.

2.0 grams of this goethite powder was reduced at a temperature of 370° C with the passing of hydrogen gas therethrough at a flow rate of 1.0 l/min for one hour, and then the product was oxidized by passing air therethrough at a temperature of 250° C for 1 hour. A brown powder of gamma-$Fe_2O_3$ was obtained. The coercivity (Hc), squareness ratio (Rs), and saturation magnetization $\sigma$ s of this gamma-$Fe_2O_3$ powder was 447 oersteds, 55%, and 72.0 emu/g, respectively.

EXAMPLE 5

An alkaline solution including sodium hydroxide in an amount of 270 grams (7.0 moles) mixed with 800 milliliters of water was charged to a reaction vessel.

279 grams (1.4 moles) of ferrous chloride ($FeCl_2.4H_2O$) dissolved into 500 milliliters of water was gradually added to the alkaline solution with stirring to form a suspension of ferrous hydroxide. Previously, a nitrogen gas was passed through the alkaline solution at a flow rate of 3.0 l/min to remove oxygen therein. Simultaneously, a nitrogen gas was passed through the resulting suspension at a temperature of 60° C with continuous strong stirring by ultrasonic means for 2.5 hours to obtain milk-white uniform colloidal ferrous hydroxide.

After that, the nitrogen gas was switched over to air which, at a flow rate of 2.0 l/min, was passed through the resulting suspension at a temperature of 60° C with continuous ultrasonic stirring to form yellow goethite in 4.0 hours.

After rinsing with water, this product material was filtered, dried and pulverized to obtain 120 grams of yellow goethite powder. The particles of the yellow goethite powder were acicular, about 0.5 microns in length, and about 20 in acicular ratio (measured as in Example 1). Moreover, the uniformity of the particle size of the goethite powder was good.

2.0 grams of this goethite powder was reduced at a temperature of 360° C with the passing therethrough of hydrogen gas at a flow rate of 1.0 l/min for one hour, and then the product was oxidized by air passing therethrough at a temperature of 250° C for 1 hour. As the result, the brown powder of gamma-$Fe_2O_3$ was obtained. The coercivity (Hc), squareness ratio (Rs), and saturation magnetization $\sigma$ s of this gamma-$Fe_2O_3$ was 455 oersteds, 55%, and 71.2 emu/g, respectively.

EXAMPLE 6

The relationships between the variations of the mol ratio and the coercivity (Hc) were examined in gamma-$Fe_2O_3$ powder derived from goethite powder produced by the method of this invention used as the starting material. The results are illustrated by the curves shown in FIG. 5. Here, a curve $a$ shows the case of a goethite derived from potassium hydroxide and ferrous chloride, and a curve $b$ shows the case of goethite derived from sodium hydroxide and ferrous sulfate. FIG. 5 illustrates that gamma-$Fe_2O_3$ powder having higher coercivity (Hc) than a conventional gamma-$Fe_2O_3$ powder can be obtained by having a mole ratio ($OH^-/Fe^{++}$) of over 2.5, and gamma-$Fe_2O_3$ powder having a coercivity (Hc) of over 440 oersteds can be obtained by having a mol ratio ($OH^-/Fe^{++}$) ranging from 3.2 to 4.5, in the case of goethite powder derived from potassium hydroxide (KOH) and ferrous chloride ($FeCl_2.4H_2O$); this case is called the "KOH-$FeCl_2$ method" herein. FIG. 5 further illustrates that gamma-$Fe_2O_3$ powder having higher coercivity (Hc) than the conventional gamma-$Fe_2O_3$ powder can be obtained by having a mole ratio ($OH^-/Fe^{++}$) of over 3, and gamma-$Fe_2O_3$ powder having coercivity (Hc) of over 440 oersteds can be obtained by having a mol ratio ranging from 3.8 to 5.8, in the case of goethite powder derived from sodium hydroxide (NaOH) and ferrous sulfate ($FeSO_4 \cdot 7H_2O$); this case is called the "NaOH-$FeSO_4$ method" herein.

While in the above examples, goethite powder produced by the process of this invention is used as a starting material for making acicular gamma-$Fe_2O_3$ powder, it will be appreciated that, of course, such may also be used as starting material for making acicular magnetite powder, as above indicated.

DESCRIPTION OF THE PREFERRED EMBODIMENTS

The present invention is directed to a method of making goethite powder. The method involves the step of mixing an aqueous solution of a water soluble ferrous salt with an aqueous solution of an alkali hydroxide to form a ferrous hydroxide. During such mixing, the liquid reactant system is stirred in an inert (non-oxidative) atmosphere. The resulting colloidal ferrous hydroxide suspension is then oxidized, with an oxygen containing gas to convert the ferrous hydroxide to goethite powder.

Preferably, the alkali hydroxide is sodium hydroxide or potassium hydroxide. Preferably, the ferrous salt is ferrous sulfate or ferrous chloride. Preferably, the stirring time for the mixture of alkali hydroxide and ferrous salt ranges from about 2 to 5 hours with a time of from about 2 to 4 hours being more preferred when ferrous sulfate is employed as the ferrous salt. Preferably, the mol ratio of $OH^-$ ions to $Fe^{++}$ ions ($OH^-/Fe^{++}$) is over about 2.5, and when, more preferably, sodium hydroxide and ferrous sulfate are used, such mol ratio of $OH^-$ ion to $Fe^{++}$ ion ($OH^-/Fe^{++}$) ranges from about 3.8 to 5.8, and when, more preferably, potassium hydroxide and ferrous chloride are used, such mol ratio of $OH^-/Fe^{++}$ ranges from about 3.2 to 4.5. Preferably, the mixing of alkali hydroxide and of ferrous salt, and the stirring of the liquid reaction system and the oxidation to goethite are carried out at a temperature in the range where goethite formation is promoted and magnetite formation is substantially prevented; thus, a temperature range of from about 40° to 60° C is more preferred for a sodium hydroxide and ferrous sulfate system and a temperature range of from about 50° to 80° C is more preferred for a potassium hydroxide and ferrous chloride system.

In accordance with the teachings of this invention, the solution including ferrous hydroxide is stirred for several hours while simultaneously prevented from being oxidized, which permits one to obtain a uniform and finely divided, colloidal sized ferrous hydroxide aqueous suspension. The method of this invention has a number of advantages among which are the following:

1. Reaction time is shortened. An oxidative reaction time required for the formation of goethite powder is unexpectedly and even remarkably shortened by stirring in an inert (non-oxidizing) gaseous (preferably nitrogen) atmosphere in accord with the present invention. Even the combined time of stirring in such a gaseous atmosphere plus the oxidative reaction time, as illustrated by FIG. 1 and FIG. 3, is characteristically shorter by a maximum of about 2 hours in the KOH-$FeCl_2$ embodiment and by a maximum of about 4.5 hours in the NaOH-$FeSO_4$ embodiment, both compared to the reaction time in the case where no stirring treatment in such inert atmosphere is performed.

2. The coercivity (Hc) of the resulting maghemite powder is increased. Maghemite powder (gamma-$Fe_2O_3$ powder) derived from a goethite powder prepared according to the method of the present invention, unexpectedly has a high coercivity (Hc) characteristically in the range from about 440 to 480 oersteds by a suitable or appropriate selection of striving time in inert (preferably nitrogen) atmosphere. As illustrated by FIG. 2 and FIG. 4, such a high coercivity (Hc) can be obtained by stirring for about 2 to 5 hours in the inert atmosphere in the KOH—$FeCl_2$ embodiment and by stirring for about 2 to 4 hours in the inert atmosphere in the NaOH—$FeSO_4$ embodiment. Moreover, by a suitable selection of the mole ratio $OH^-/Fe^{++}$ in a goethite powder made by the present invention and used as the starting material for making a gamma-$Fe_2O_3$ powder, one can produce a higher maghemite powder coercivity than in a conventional maghemite powder. As shown by FIG. 5, a mol ratio ($OH^-/Fe^{++}$) of over about 2.5 may be selected in the KOH-$FeCl_2$ embodiment, and a mole ratio ($OH^-/Fe^{++}$) of over about 3 may be selected in the NaOH-$FeSO_4$ embodiment. Thus, preferably, at a mole ratio ($OH^-/Fe^{++}$) of 3.2 to 4.5 in the KOH—$FeCl_2$ embodiment, and at a mol ratio ($OH^-/Fe^{++}$) of 3.8 to 5.8 in the NaOH—$FeSO_4$ embodiment, a goethite powder is produced which, when used as a starting material for making a gamma-$Fe_2O_3$ powder, produces a gamma-$Fe_2O_3$ powder having a coercivity (Hc) of over about 440 oersteds.

3. Uniformity of particle size in the resulting goethite. The uniformity of a particle size of the resulting goethite powder is unexpectedly improved by stirring the solution including ferrous hydroxide in an inert (non-oxidative) gaseous (preferably nitrogen) atmosphere. This procedure makes uniform, fine grained ferrous hydroxide particles. Such improved uniformity is confirmed by electron-microscopy. The size of the ferrous hydroxide particles in aqueous suspension produced in accord with this invention cannot be measured because the ferrous hydroxide quickly oxidizes in air, and, therefore, when such a suspension becomes milk-white in color, the stirring of the suspension may be ended, which also indicates that the ferrous ($Fe^{++}$) ions have been substantially completely consumed. In a magnetic tape made using a gamma-$Fe_2O_3$ powder derived from a goethite powder produced according to the method of the present invention, the orientation of such gamma-$Fe_2O_3$ powder is observed to be improved and the printing level such is observed to be desirably low.

4. Ease of oxidative reaction temperature control. In general, the higher the temperature of the goethite oxidative reaction with oxygen bearing gas (preferably air), the higher the coercivity (Hc) and the better the magnetic properties obtained. However, characteristically, yellow goethite is not formed, but black magnetite is obtained as a reaction product, at reaction temperatures of over 70° C when sodium hydroxide is used as the alkali, and at the temperature of over 90° C when potassium is used as the alkali. Therefore, the temperature of an oxidative reaction by the passing, for example, of air through a ferrous hydroxide suspension produced by this invention, may be normally about 40° to 60° C when sodium hydroxide is used, and normally about 50° to 80° C when potassium hydroxide is used.

On the other hand, a ferrous ion in a solution of ferrous salt is inherently unstable and is apt to be converted to a ferric ion in hot water, and a hot alkali solution can be dangerous. Therefore, a solution of ferrous salt and an alkali hydroxide solution are preferably mixed at the relatively low temperatures indicated.

Preferably, in the practice of this invention, a solution of ferrous salt and a solution of alkali hydroxide are mixed at a relatively low temperature, stirred in a nitrogen atmosphere to prevent oxidation, then heated up to a higher temperature before the oxidative reaction is started. Such a procedure favors the desired better results obtained with the practice of the present invention in comparison to the conventional maghemite preparation method in which heating and air bubbling are started at the same time when the solution of ferrous salt and the alkaline solution are mixed.

The concentration of alkali hydroxide in a starting solution prior to the mixing of such with a starting solution of soluble ferrous salt can range very widely; typically, one may employ in such from about 1.2 to 3.0 mol of dissolved alkali hydroxide per liter of water. Similarly, the concentration of ferrous salt in a starting solution prior to the mixing of such with a starting solution of alkali hydroxide can range very widely; typically, one may employ in such from about 6.0 to about 12.0 mol of water soluble, dissolved ferrous salt per liter of water.

While for purposes of the present invention it is preferred to mix a solution of ferrous salt with a solution of alkali hydroxide simultaneously with stirring, it is also preferred to complete such mixing while stirring is still being continued; thus, a typical mixing time ranges from about 0.7 to 83.3% of the total stirring time.

While air constitutes a preferred oxygen-containing gas for purposes of accomplishing oxidation of ferrous hydroxide to goethite, those skilled in the art will appreciate that any oxygen containing gas may be used in such oxidation reaction to achieve a contacting between oxygen gas and colloidal particles of ferrous hydroxide suspended in water. Pure oxygen may be employed, for example, or predetermined mixture of oxygen with inert gasses may be employed, such as mixtures of oxygen and nitrogen, or the like, as those skilled in the art will appreciate.

Preferably, the oxidation reaction is conducted until the ferrous ions are substantially completely consumed, although, for certain purposes, some residual amounts of ferrous ions may be present at the termination of an oxidation reaction. Any convenient qualitative or quantitative technique may be employed to determine or set the end point of the oxidative reaction.

After formation of yellow goethite particles in water in accordance with the teachings of this invention, the resulting mixture comprised of such goethite particles, water, and dissolved materials is conveniently filtered to separate such goethite and these separated solids are thereafter dried and powdered. Drying may be accomplished by any convenient means. For example, air drying of the solids at a temperature in the range from about 80° C to 140° C may be employed. The dried powder is then pulverized by any convenient means. For example, a mortar and pestle may be used, as those skilled in the art will appreciate.

What is claimed is:

1. In the production of goethite, the improvement comprising a method of making acicular goethite powder comprising the steps of:

1. mixing in a relatively short time an aqueous solution of an alkali hydroxide selected from the group consisting of sodium hydroxide and potassium hydroxide with an aqueous solution of ferrous salt selected from the group consisting of ferrous chloride and ferrous sulfate under an inert atmosphere to form a suspension of ferrous hydroxide in a temperature range of 60° to 80° centigrade,
   2. continuously stirring said mixed ferrous hydroxide suspension for a period of 2 to 5 hours which time is substantially greater than said mixing time under an inert gaseous atmosphere until milk-white colored fine ferrous hydroxide suspension is formed, and during said period of stirring the temperature of the solution being in the temperature range of 60° to 80° centrigrade,
   3. and then oxidizing said ferrous hydroxide suspension by an oxygen containing gas for a period of 4 to 6.5 hours until yellow colored goethite is formed, the temperature range being 50° to 80° centigrade when the alkali hydroxide is potassium hydroxide and the ferrous salt is ferrous chloride and the temperature range being 40° to 60° centigrade when sodium hydroxide is the alkali hydroxide and the ferrous salt is ferrous sulfate.

2. A method of making goethite powder according to claim 1, wherein a mol ratio of $OH^-$ ion to $Fe^{++}$ ion ($OH^-/Fe^{++}$) is over 3.

3. A method of making goethite powder according to claim 1, wherein a mole ratio of $OH^-$ ion to $Fe^{++}$ ion ($OH^-/Fe^{++}$) is 3.8–5.8.

4. The method of claim 1, wherein said contacting is continued until substantially all of the ferrous ions in said suspension have been removed by oxidation.

5. The method of claim 1, wherein after said contacting is completed, the resulting mixture is filtered, and the so separated solids are dried and pulverized.

6. The method of claim 1, wherein the concentration of said ferrous salt in said starting solution thereof ranges from about 1.2 to 3.0 mol per liter of water.

7. The method of claim 1, wherein the concentration of said alkali hydroxide in said starting solution thereof ranges from about 6.0 to 12.0 mol per liter of water.

8. The method of claim 1, wherein said inert gaseous atmosphere comprises nitrogen.

9. The method of claim 1, wherein said oxygen containing gas comprises air.

10. In the production of goethite, the improvement comprising a method of making acicular goethite powder comprising a method of steps of mixing and simultaneously stirring for a relatively short time an aqueous solution of an alkali hydroxide selected from the group consisting of potassium hydroxide and sodium hydroxide with an aqueous solution of a ferrous salt, selected from the group consisting of ferrous chloride and ferrous sulfate in a temperature range of 60° to 80° centigrade and then continuing said stirring of the resulting mixture thereby to produce a colloidal aqueous suspension of ferrous hydroxide, said stirring being continued for a period of 2 to 5 hours until milk-white colored ferrous hydroxide suspension is formed, said mixing being accomplished in a time interval less than that used for said stirring, said mixing and said stirring being carried out in an inert gaseous atmosphere, during said stirring the temperature of said solution maintained in the temperature range of 60 to 80° C, and thereafter contacting the resulting suspension with an oxygen containing gas, thereby to oxidize said ferrous hydroxide for a period of 4 to 6.5 hours until yellow goethite is formed the temperature being 50° to 80° centigrade when potassium hydroxide and ferrous chloride is used and the temperature of 40° to 60° centrigrade when sodium hydroxide and ferrous sulfate is used.

11. A method of making goethite powder according to claim 10, wherein a mol ratio of $OH^-$ ion to $Fe^{++}$ ion ($OH^-/Fe^{++}$) is 3.2–4.5.

12. A method of making goethite powder according to claim 10, wherein said fine ferrous hydroxide suspension is oxidized at the temperature of 50°–80° C.

* * * * *